United States Patent Office 2,808,068
Patented Oct. 1, 1957

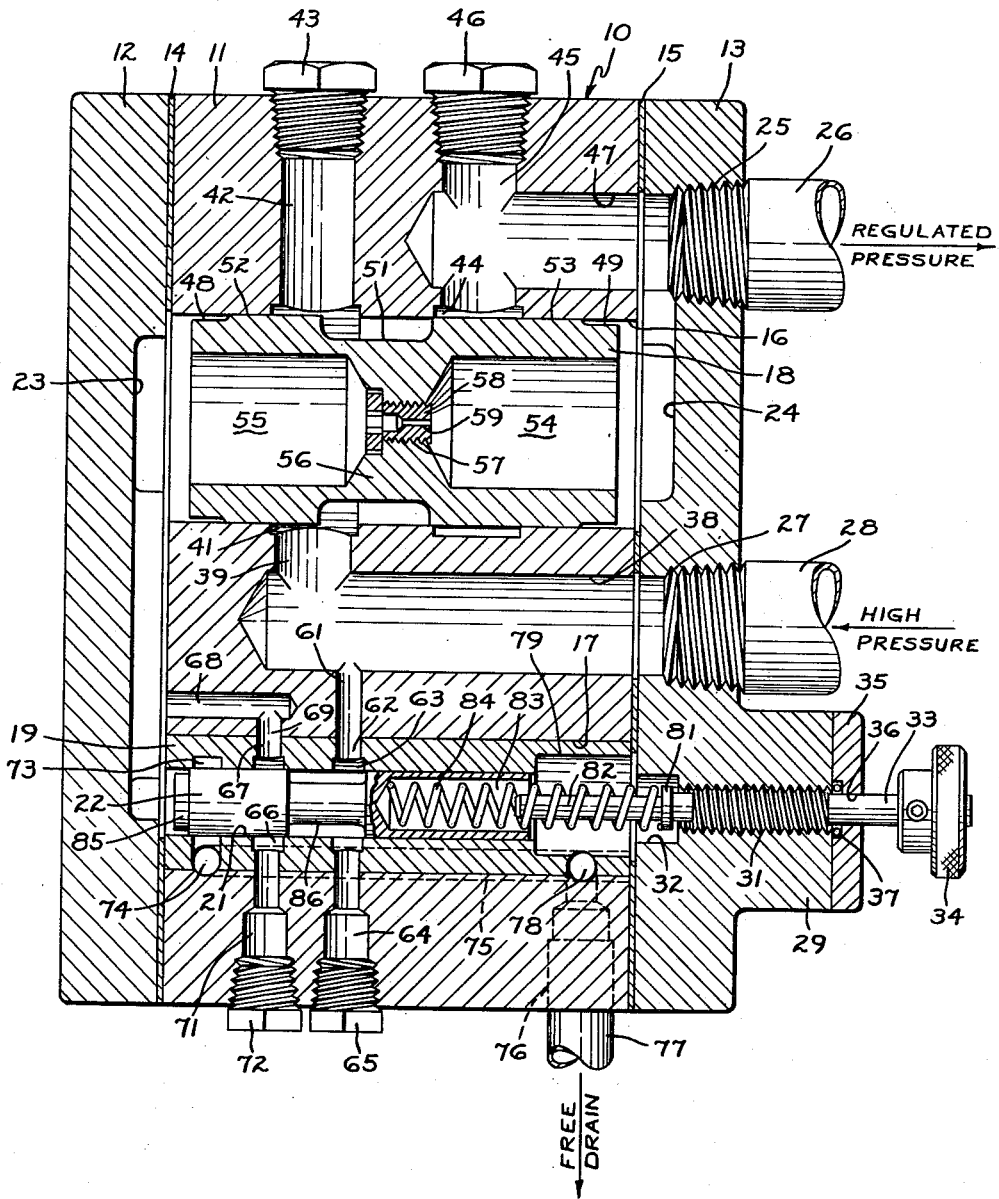

2,808,068

REGULATING VALVE

Fred Thomas, Worcester, Mass., assignor to The Heald Machine Company, Worcester, Mass., a corporation of Delaware Application October 16, 1956, Serial No. 616,256

6 Claims. (Cl. 137—110)

This invention relates to a regulating valve and more particularly to apparatus arranged for insertion in a hydraulic system to produce a constant output pressure irrespective of changes in input pressure or volume.

It is common practice in the construction of regulating valves to permit the valving orifice to be adjusted by the difference between the force of the outlet pressure on one side of a diaphragm and the force of a spring on the other side. When such a valve must pass a widely varying volume of fluid, it must provide a large opening or a small opening as required. This means that the length of the spring changes and, consequently, the force on the valve changes considerably when the spring is of practical length. The opposing forces acting on the diaphragm are in balance except for errors in the regulated pressure. These errors must be great enough to overcome the inertia of the spring and other parts, along with any friction and with the force developed by the flow of fluid through the valve. This defect is particularly noticeable when the load is not consuming hydraulic fluid and the valve is completely closed; leakage through the valve is high because the force available to close the valve is low, and this causes the output pressure to increase slowly. This undesirable increase in pressure may increase to a very high value before the valve senses the change and takes action to correct it. This problem is greatest when regulating from a high input pressure to a low output pressure, in which situation leakage is, naturally, greatest and yet the conventional correcting mechanism is most sensitive. If at the same time the tolerated variations in the regulated pressure are small, the problem becomes insurmountable. These and other difficulties experienced with previously-known devices have been obviated in a novel way by the present invention.

It is, therefore, an outstanding object of the invention to provide a regulating valve capable of satisfactory operation and which will accurately maintain a desired pressure over a wide range of volume, at high ratio of input to output regulated pressure, and at low regulated pressure.

Another object of this invention is the provision of a pressure regulating valve which is operative at low regulated pressures and which is operated by a comparatively high pressure to correct for small changes in the regulated pressure.

It is a further object of the instant invention to provide a pressure regulating valve which will maintain the regulated pressure at a constant value despite leakage of fluid through the valve.

Another object of this invention is the provision of a pressure regulating valve particularly suited for use where a large volume range of fluid is required by the output line at a low regulated pressure.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

The single figure is a sectional view through a regulating valve constructed according to the principles of the invention.

Referring to the drawing, the regulating valve, indicated generally by the reference numeral 10, consists of a main body 11 of generally rectangular parallelepipedal form having a left cover plate 12 bolted to the left face thereof. To the opposite face of the main body is bolted a right cover plate 13. A gasket 14 is interposed between the plate 12 and the main body, while a similar gasket 15 lies between the plate 13 and the main body. The main body 11 is provided with a primary bore 16 which extends entirely through the body from the left surface to the right surface; a secondary bore 17 extends through the body between the same surfaces. A regulating piston 18 of generally cylindrical shape is slidably carried in the primary bore 16, while a pilot liner 19 is fixedly mounted in the secondary bore 17. The liner is of a generally tubular configuration and is provided with a bore 21 which is coaxial with the secondary bore 17. Within the liner 19 and slidable along the bore 21 is a pilot piston 22.

The left cover plate 12 is formed with a recess 23 which overlies and extends between the left ends of the bores 16 and 21, so that these bores are connected hydraulically at all times. The right cover plate 13 is formed with a similar recess 24 which overlies the right end of the bore 16 and connects it with a threaded bore 25 which extends through the plate; threaded in the bore 25 is a conduit 26 which is connected to the load, not shown, which may comprise a hydraulic linear actuator or the like. It is the function of the valve to maintain the pressure in the conduit 26 at a constant value irrespective of the volume of fluid demanded by the load. At an intermediate position in the plate it is provided with a threaded bore 27 which passes through the plate and has a conduit 28 threadedly connected to its outer end; the conduit is connected to a pump, not shown, and provides the valve with hydraulic fluid at high pressure. Near the bottom of the valve, the plate is provided with an outwardly-directed boss 29; a threaded bore 31 extends through the plate centrally of the bore and is provided at its inner end with a counterbore 32. Threadedly mounted in the bore 31 is an adjusting rod 33 having a handle 34 fastened to its outer end. A small sealing plate 35 is fastened to the boss and has an aperture 36 through which the rod 33 extends; a rubber O-ring 37 is mounted in the bore and prevents leakage around the rod.

Aligned with the high pressure conduit 28 and the bore 27 in the plate is a bore 38 which extends transversely into the main body a considerable distance. At its left end it intersects a vertical bore 39 connecting it to an annular groove 41 formed in the wall of the primary bore 16. The machining operation of cutting the bore 39 is facilitated by the provision of a bore 42 which enters the main body in alignment with the bore 39 and terminates in its intersection with the groove 41; a threaded plug 43 normally closes the outer end of the bore 42. An annular groove 44 is also formed in the primary bore 16 at a position spaced somewhat from the groove 41. A large bore 45 enters the upper end of the main body and terminates in an intersection with the groove 44; it is threaded at its outer end to receive a plug 46 which normally closes the said outer end. Another large bore 47 enters the right side of the main body in alignment with the regulated pressure conduit 26 and the bore 25; the bore 47 is terminated after it has intersected the bore 45.

As has been stated, the regulating piston 18 is provided with a generally cylindrical conformation and slides readily in the primary bore 16. At its left end it is formed with a relief groove 48, while a similar groove 49 is formed at the right end. A large metering groove 51 is formed in the central part of the piston and serves to divide the outer cylindrical surface of the piston into a first portion 52 and a second portion 53. A large cylindrical chamber 54 is formed in the right end of the piston, while a similar chamber 55 is formed in the left end; the inner ends of the chambers are separated by a wall 56 and a threaded bore 57 extends through the wall. Threadedly mounted in this bore is an orifice plug 58 having a fine passage or orifice 59 extending therethrough and constituting the sole connection between the chambers 54 and 55. It should be noted that the groove 51 extends axially of the piston a distance sufficient, on occasion, to embrace considerable portions of the grooves 41 and 44 at the same time. The first portion 52 of the piston is of sufficient axial extent to cover the groove 41 completely on occasion and the second portion 53 is capable of the same function relative to the groove 44.

A small passage 61 extends downwardly from the bore 38; it is aligned with and connected with a similar passage 62 extending through the liner 19 and intersecting an annular groove 63 formed in the bore 21. It is possible to machine the passages 61 and 62 because of the access permitted by a threaded bore 64 which enters the main body in alignment with these passages. A threaded plug 65 closes the outer end of the bore 64 under ordinary circumstances. Another annular groove 66 is formed in the bore 21 at a position spaced from the groove 63; a small vertical passage 67 formed in the liner leaves the groove and joins a passage 69 in the main body which meets the inner end of a small passage 68 which enters the body at a part of the left side that is subtended by the recess 23. Machining of the passages 67 and 69 is made possible by a threaded bore 71 through the main body, this bore being normally retained in closed condition by a plug 72. Closely adjacent the left end of the bore 21 is formed another annular groove 73. From this groove extends a bore 74 having an axis perpendicular to the drawing. The other end of the bore 73 meets one end of a transverse bore 75, the other end of which meets the upper end of a vertical threaded bore 76. A free drain conduit 77 is threadedly engaged with the bore 76 and serves to connect the valve to the oil reservoir or tank, not shown. The bore 76 is also connected to one end of a bore 78 which is parallel to the bore 77, the other end of the bore 78 entering a counterbore 79 formed at the right end of the secondary bore 21.

The portion of the adjusting rod 33 which lies within the counterbore 32 in the plate 13 is provided with a disk-like flange 81 and a finger 82 extends toward the pilot piston 22. This piston is formed at its right end with a bored recess 83 having a conical end. A coil spring 84 surrounds the finger 82 and has its right end pressed against the flange 81. The other end of the spring presses in the conical end of the recess 83. The left end of the piston 22 is provided with a small relief groove 85. In its intermediate portion the pilot piston is formed with a groove 86 which is capable, on occasion, of subtending substantial parts of both grooves 63 and 66.

The operation of the valve will now be readily understood in view of the above description. High pressure oil from the pump enters the valve through the conduit 28 and the bore 27. The high pressure hydraulic fluid fills the bore 38, the bore 39 and the groove 41 in the primary bore 16. If the regulated pressure in the conduit 26 is at the selected value, the regulating piston will reside in the position shown in the drawing and high pressure oil fills the groove 51 in the piston, but cannot flow into the groove 44 in the bore. Hydraulic fluid at the output or regulated pressure fills the groove 44, the bore 45, the bore 47, the threaded bore 25, the recess 24 in the right cover plate, the right end of the primary bore 16, and the chamber 54 at the right end of the piston. In other words, the force acting on the right end of the piston is the pressure of the regulated fluid multiplied by the projected area of the piston cross-section. Fluid also resides in the left end of the bore and in the chamber 55 of the piston, as well as in the recess 23 in the plate and in the left end of the pilot bore 21; the spaces just ennumerated are connected to the chamber 54 by means of the orifice 59. The pressure in these spaces will be the same as the regulated pressure after a period of time if the regulated pressure remains constant, but, because the flow of fluid through the orifice is small, there is a considerable time lag between the time when a change takes place in the regulated pressure and the time when the pressure on the other side of the piston changes by an equal amount. The force acting on the left end of the piston is, of course, equal to the pressure in the chamber 55 multiplied by the cross-sectional area of the piston. It is obvious, then, that, when the regulated pressure changes quickly by a large amount, the piston 18 will move. If, for instance, the regulated pressure drops quickly, due to a large demand from the load, the piston moves to the right until the groove 51 overlies the groove 44. Oil is free, then, to flow from the high pressure bore 38 to the regulated pressure bore 47. When the regulated pressure has been returned to the selected level, the piston 18 will move to the left again and the groove 44 will be covered by the second cylindrical portion 53.

When the load is not remaining fluid from the conduit 26, there is a tendency for the discharge pressure of the valve to increase slowly due to leakage. This leakage may take place despite a fairly tight fit between the portion 53 and the bore 16, so that fluid passes from the groove 51 to the groove 44. Such leakage is most likely when the high pressure entering the valve is very much greater than the regulated pressure, so that the pressure differential across the valving surfaces of the regulating piston is very great. Since this increase in regulated or output pressure is very slow, the pressure in the chamber 55 rises at approximately the same rate, despite the small size of the orifice 59. Now, the pressure experienced in the body of fluid contained in the chamber 55 is also felt in the body of fluid contained in the recess 23 of the left cover plate and the left end of the pilot bore 21, as well as the passages 68, 69 and 67 and the groove 66. The space at the opposite end of the pilot piston 22 is connected to free drain through the bore 78, the bore 76 and the conduit 77, so that the only force acting on the right end of the pilot piston is due to the spring 84. In any case, when the regulated pressure rises slowly due to leakage, the pressure acting on the left end of the pilot piston increases also and the force is sufficient to move the piston to the right against the spring force. With sufficient increase in pressure, the piston is moved to the right far enough for the groove 73 to have access to the left end of the pilot bore 21. Pressure fluid then flows to drain through the groove 73, the bores 74, 75, 78 and 76, and the conduit 77. In this way the excess pressure in the chamber 55 is relieved and, through the medium of the orifice 59, the regulated pressure is also reduced.

When large and rapid reductions in the regulated pressure take place, the situation is corrected by movement of the regulating piston 18. However, when a drop in pressure takes place which is small or takes place slowly, the inertia of the heavy regulating piston is too great to respond. Therefore, a sensitive control is provided by the pilot piston. The reduction in regulated pressure makes itself felt in the chamber 55 through the medium of the orifice 59. The reduction is also felt at the left of the pilot piston 22, causing the piston to move to the left. If the movement of the piston is sufficient, the groove 86 connects the grooves 63 and 66 hydraulically. When this takes place, high pressure flows from the large bore 38 to the right side of the piston 18 through the passage 61, the passage 62, the grooves 63, 86 and 66, the passages 69 and 68, the recess 23, the chamber 55, and the orifice 59. High pressure supplements the regulated pressure in this way until the desired regulated pressure is reached. It should be noted that the orifice 59 introduces a time lag into the system, so that sudden large decreases of regulated pressure do not make themselves felt in the chamber 55 for a considerable period of time and the regulating piston has already compensated for such changes by the time the period has elapsed.

If the load is suddenly shut off, there may be a sudden, large surge in the regulated pressure. The main piston 18 will then move quickly to the left and shut off flow. The pilot piston will eventually relieve any residual amount of pressure over the selected level in the same way as for a leakage pressure increase.

It might be said, then, that the valve of the invention provides a normal control of regulated pressure to compensate for large, sudden changes and a vernier control to compensate for small, slow changes.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A pressure regulating valve for use with hydraulic fluid, comprising a main body having a primary bore and a secondary bore, a regulating piston slidably mounted in the primary bore, a pilot piston slidably mounted in the secondary bore, a high pressure space associated with the primary bore, a regualted pressure space associated with the primary bore connected hydraulically to one end of the regulating piston, means associated with the regulating piston for connecting the high pressure space and the regulated pressure space hydraulically on occasion, a small orifice connecting the said one end of the regulating piston to the other end, means connecting the said other end of the regulating piston to one end of the pilot piston, a drain space associated with the secondary bore, a high pressure space associated with the secondary bore, means operative when the force on the said one end of the pilot piston exceeds a selected maximum value to connect the said one end to the drain space, and means operative when the force on the said one end of the pilot valve falls below a minimum value to connect the high pressure space to the said other end of the regulating piston.

2. A pressure regulating valve for use with hydraulic fluid, comprising a main body having a primary bore and a secondary bore, a regulating piston slidably mounted in the primary bore, a pilot piston slidably mounted in the secondary bore, a high pressure groove in the primary bore, a regulated pressure groove in the primary bore connected hydraulically to a first end of the regulating piston, a groove formed in the regulating piston to connect the high pressure groove and the regulated pressure groove hydraulically on occasion, a small orifice connecting the said first end of the regulating piston to the second end, means connecting the said second end of the regulating piston to a first end of the pilot piston, a drain groove formed in the secondary bore, a high pressure groove formed in the secondary bore, means operative when the force on the said first end of the pilot piston exceeds a pre-selected value to connect the said end to the drain groove, and means operative when the force on the said first end of the pilot valve falls below another pre-selected value to connect the high pressure groove to the said second end of the regulating piston.

3. A pressure regulating valve for use with hydraulic fluid, comprising a main body having a primary bore and a secondary bore, a regulating piston slidably mounted in the primary bore, a pilot piston slidably mounted in the secondary bore, a high pressure groove in the primary bore, a regulated pressure groove in the primary bore connected hydraulically to a first end of the regulating piston, a groove formed in the regulating piston to connect the high pressure groove and the regulated pressure groove hydraulically on occasion, a small orifice connecting the said first end of the regulating piston to the second end, means connecting the said second end of the regulating piston to a first end of the pilot piston, a spring passing against the other end of the pilot piston, a drain groove formed in the secondary bore, a high pressure groove formed in the secondary bore, the drain groove being located adjacent the said one end of the pilot piston so that when the force on the said first end of the pilot piston exceeds a pre-selected value the said end is connected to the drain groove, and means operative when the force on the said first end of the pilot valve falls below another pre-selected value to connect the high pressure groove to the said second end of the regulating piston.

4. A pressure regulating valve for use with hydraulic fluid, comprising a main body having a primary bore and a secondary bore, a regulating piston slidably mounted in the primary bore, a pilot piston slidably mounted in the secondary bore, a high pressure groove in the primary bore, a regulated pressure groove in the primary bore connected hydraulically to a first end of the regulating piston, a groove formed in the regulating piston to connect the high pressure groove and the regulated pressure groove hydraulically on occasion, a small orifice connecting the said first end of the regulating piston to the second end, means connecting the said second end of the regulating piston to a first end of the pilot piston, a drain groove formed in the secondary bore, a high pressure groove formed in the secondary bore, a feed-back groove formed in the secondary bore and having a passage leading to the said second end of the regulating piston, means operative when the force on the said first end of the pilot piston exceeds a pre-selected value to connect the said end to the drain groove, and a groove formed in the pilot piston operative when the force on the said first end of the pilot valve falls below another pre-selected value to connect the high pressure groove to the feed-back groove.

5. A pressure regulating valve for use with hydraulic fluid, comprising a main body having a primary bore and a secondary bore, a regulating piston slidably mounted in the primary bore, a pilot piston slidably mounted in the secondary bore, a high pressure groove in the primary bore, a regulated pressure groove in the primary bore connected hydraulically to a first end of the regulating piston, a groove formed in the regulating piston to connect the high pressure groove and the regulated pressure groove hydraulically on occasion, a small orifice connecting the said first end of the regulating piston to the second end, means connecting the said second end of the regulating piston to a first end of the pilot piston, a spring pressing against the other end of the pilot piston, a drain groove formed in the secondary bore, a high pressure groove formed in the secondary bore, a feed-back groove formed in the secondary bore and having a passage leading to the said second end of the regulating piston, the drain groove being located adjacent the said one end of the pilot piston so that when the force on the said first end of the pilot piston exceeds a pre-selected value the said end is connected to the drain groove, and a groove formed in the pilot piston operative when the force on the said first end of the pilot valve falls below another pre-selected value to connect the high pressure groove to the feed-back groove.

6. A pressure regulating valve for use with hydraulic fluid, comprising a main body, a regulating piston slidably mounted in the body, a pilot piston slidably mounted in the body, a high pressure space associated with the regulating piston, a regulated pressure space associated with the regulating piston and connected hydraulically to one end thereof, means associated with the regulating piston for connecting the high pressure space and the regulated pressure space hydraulically on occasion, a small orifice connecting the said one end of the regulating piston to the other end, means connecting the said other end of the regulating piston to one end of the pilot piston, a drain space associated with the pilot piston, a high pressure space associated with the pilot piston, means operative when the force on the said one end of the pilot piston exceeds a selected maximum value to connect the said one end to the drain space, and means operative when the force on the said one end of the pilot valve falls below a selected minimum value to connect the high pressure space to the said other end of the regulating piston.

References Cited in the file of this patent

UNITED STATES PATENTS 2,270,304    Jacobsson _____ Jan. 20, 1942

FOREIGN PATENTS 681,437    Great Britain _____ Oct. 22, 1952
708,143    Great Britain _____ Apr. 28, 1954